(12) United States Patent
Hsu

(10) Patent No.: US 6,457,377 B1
(45) Date of Patent: Oct. 1, 2002

(54) RENOVATED BRAKE STRUCTURE FOR AN AUXILIARY MOVING DEVICE

(75) Inventor: Chun-Shan Hsu, No. 435-2, Sec. 2, Da Guan Rd., Pan Chiao City, Taipei Hsien (TW)

(73) Assignees: Apex Medical Corp., Taipei Hsien (TW); Chun-Shan Hsu, Taipei Hsien (TW)

( * ) Notice: Subject to any disclaimer, the term of this patent is extended or adjusted under 35 U.S.C. 154(b) by 7 days.

(21) Appl. No.: 09/756,138

(22) Filed: Jan. 9, 2001

(51) Int. Cl.[7] ................................................. F16C 1/10
(52) U.S. Cl. ............................ 74/502.2; 74/489; 74/526
(58) Field of Search ............................. 74/500.5, 501.6, 74/502.2, 526, 489

(56) References Cited

U.S. PATENT DOCUMENTS

| | | | | |
|---|---|---|---|---|
| 735,113 A | * | 8/1903 | Kelland et al. ................ | 74/489 |
| 5,279,179 A | * | 1/1994 | Yoshigai ..................... | 74/500.5 |
| 5,528,954 A | * | 6/1996 | Yoshigai ...................... | 74/516 |
| 5,865,064 A | * | 2/1999 | Yamashita et al. .......... | 74/502.2 |
| 6,079,290 A | * | 6/2000 | Li ............................... | 74/502.2 |
| 6,202,502 B1 | * | 3/2001 | Chung-Che .................. | 74/526 |
| 6,247,379 B1 | * | 6/2001 | Chen ............................ | 74/489 |
| 6,298,744 B1 | * | 10/2001 | Huang ......................... | 74/489 |

* cited by examiner

Primary Examiner—Chong H. Kim
(74) Attorney, Agent, or Firm—Rosenberg, Klein & Lee

(57) ABSTRACT

A renovated brake structure for an auxiliary moving device comprises a grip, a cover, a brake wire and a handle. The cover is secured to the handle and the grip is pivoted to the cover. The grip is secured to one end of the brake wire with a stud, whereas the other end of the brake wire having a spring to urge the grip to resume to original position. The grip comprises a pair of linking rods with a rail and a connecting pin on each rod. Each linking rod is connected at one end to a stud which is to secure with on end of a brake wire. A pair of holes are formed at the front respective ends of the grip for insertion of the pins. An arc trough is formed at one end of the grip with an elastic stopper at one end and a locating hole at the other end. A stop pin extending from the cover is inserted through the arc trough of the grip to secure the grip to the cover. Thus, by pulling the grip either towards or away from the handle, the linking rods are pulled and the stop pin of the cover slides into the arc trough to stop the auxiliary moving device.

4 Claims, 5 Drawing Sheets

RENOVATED BRAKE STRUCTURE FOR AN AUXILIARY MOVING DEVICE

FIELD OF THE INVENTION

This invention relates to a brake structure for an auxiliary moving device, and more particularly to a grip of a brake system by pulling it towards or away the device, the moving device can be stopped and may be held in a stopped position for a while.

BACKGROUND OF THE INVENTION

A conventional brake system of an auxiliary moving device is designed to stop the moving by pulling a grip towards the device, however, the brake system can not hold the moving device which is inconvenient to users.

In view of this, the inventor has invented a new design, which may stop the device by pulling the grip towards either direction and may also hold the device for as long as the users desired.

SUMMARY OF THE INVENTION

It is the primary object of the present invention to provide a brake system for an auxiliary moving device, which is safe in use.

It is another object of the present invention to provide a brake system for an auxiliary moving device, which is easy and convenient to operate.

It is a further object of the present invention to provide a brake system for an auxiliary moving device, which is solid and lasts longer.

DETAILED DESCRIPTION OF THE PREFERRED EMBODIMENTS

Figure 1:
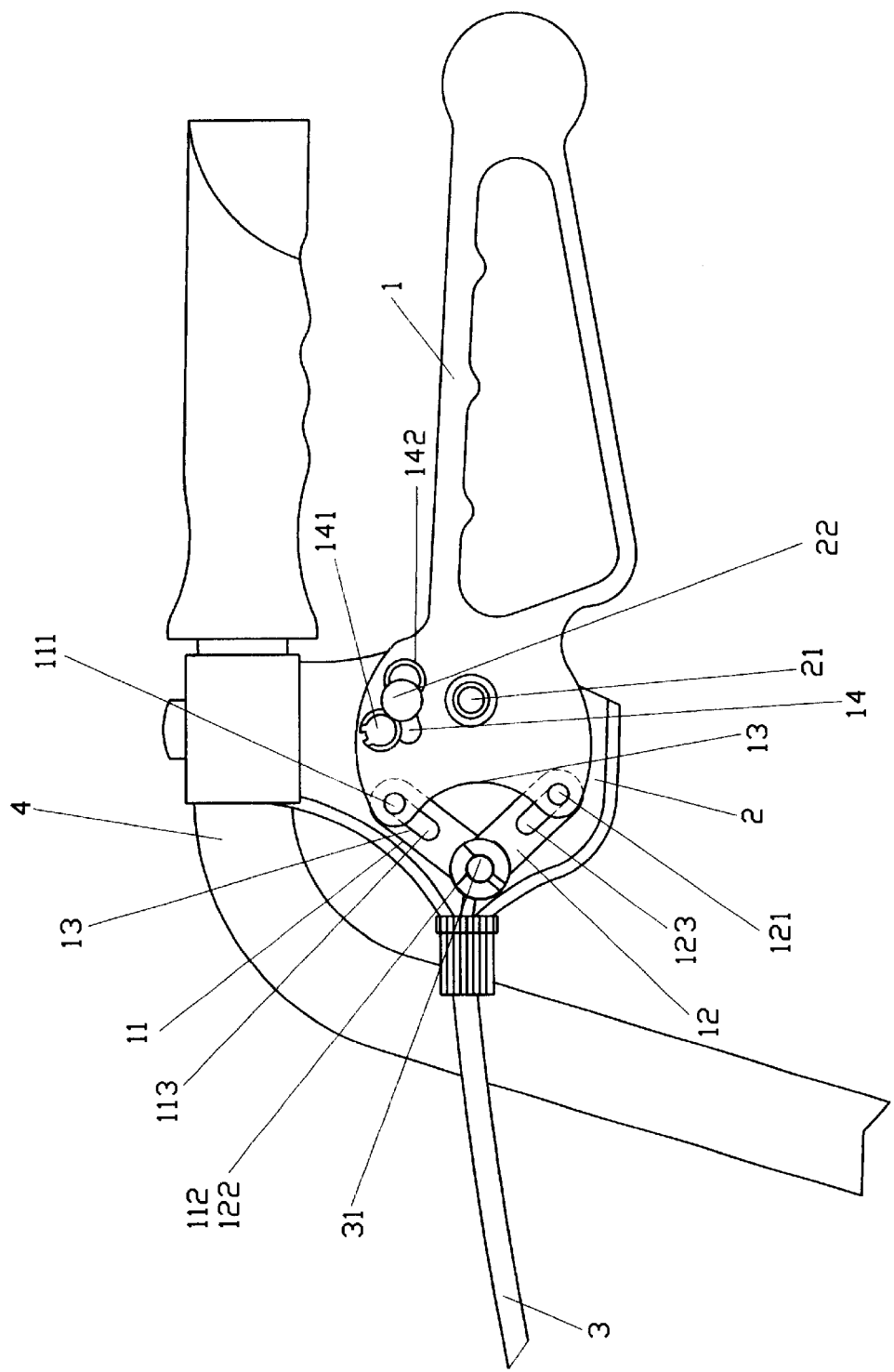
FIG. 1 is a perspective of the present invention, partially sectioned.

A brake system for an auxiliary moving device of the present invention comprises a grip 1, a cover 2, a brake wire 3, and a handle 4, as shown in FIG. 1.

The cover 2 is secured to the handle 4, and the grip 1 is pivoted to the cover 2 by a pivot 21. The grip 2 and one end of the brake wire 3 are secured by a stud 31, whereas the other end of the brake wire 3 (having a spring, not shown) provides a constant force to urge the grip 1 to resume to its original position.

The grip 1 comprises a pair of linking rods 11 and 12 and their connecting pins 111 and 112. Each of the inking rods 11 and 12 has a trough 112 and 122. Each linking rod 11 and 12 has a rail 113 and 123. An arc edge 13 is formed on the front end of the grip 1, each side of the arc edge 13 is formed a hole overlapping with the connecting pins 111 and 121. The connecting pins 111 and 121 of the linking rods 11 and 12 are inserted through the troughs 113 and 123 and the holes of the arc edge 13 to secure the linking rods 11 and 12 to the grip 1. The troughs 112 and 122 of the other ends of the linking rods 11 and 12 are secured with the stud 31 of the brake wire 3.

The grip 1 further comprises an arc trough 14 which has an elastic stopper 141 at one end and a locating hole 142 at the other end, this locating hole 142 has a larger diameter than the arc trough 14.

Figure 3:
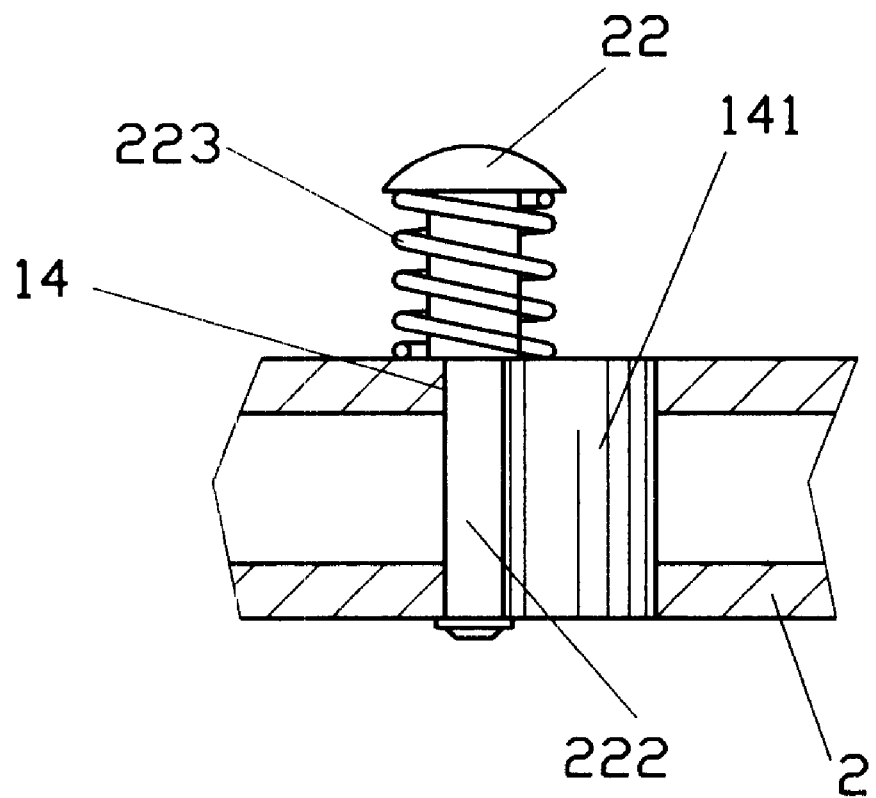
FIG. 3 is an enlarged view of a stop pin of the present invention.
Figure 5:
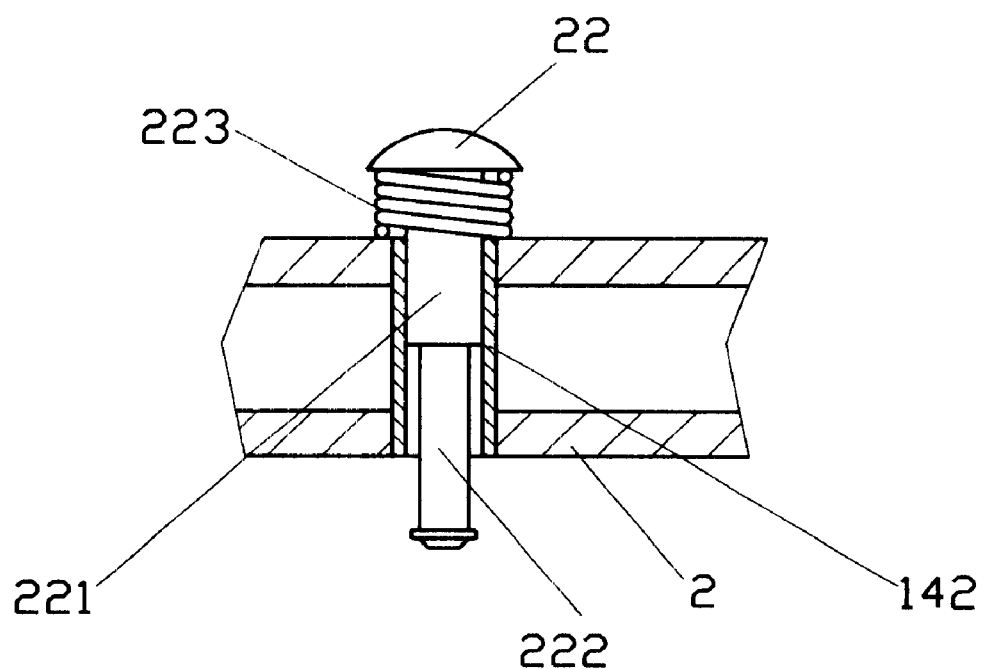
FIG. 5 is an enlarged view showing the stop pin engaged with and stopped by a locating hole of an arc trough of the present invention.

The cover 2 has a stop pin 22 which inserts through the corresponding arc trough 14, as shown in FIGS. 3 and 5. The pin 22 is sleeved into a spring 223 and has a large section 221 and a small section 222 which stays and slides within the arc trough 14.

Figure 2:
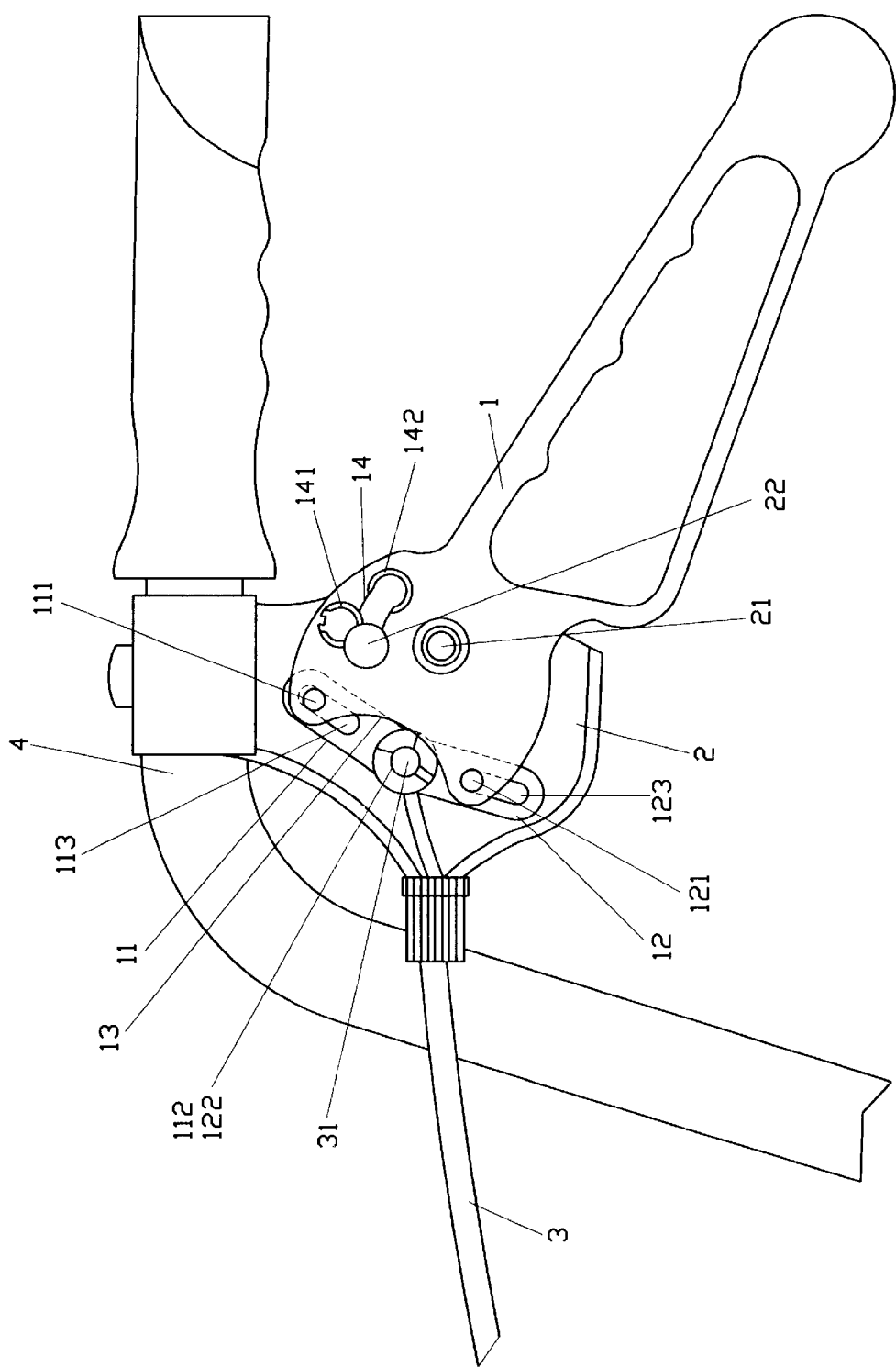
FIG. 2 is a view similar to FIG. 1 with a grip pulling downward to a stopped position.

By pulling the grip 1 away from the handle 4, as shown in FIG. 2, the connecting pins 111 and 121 slide in the rails 113 and 123 of the linking rods 11 and 12, thus the brake wire 3 is pulled to stop the moving. The small section 222 of the stop pin 22 is stopped by the elastic stopper 141 in the arc trough 14, as shown in FIG. 3.

Figure 4:
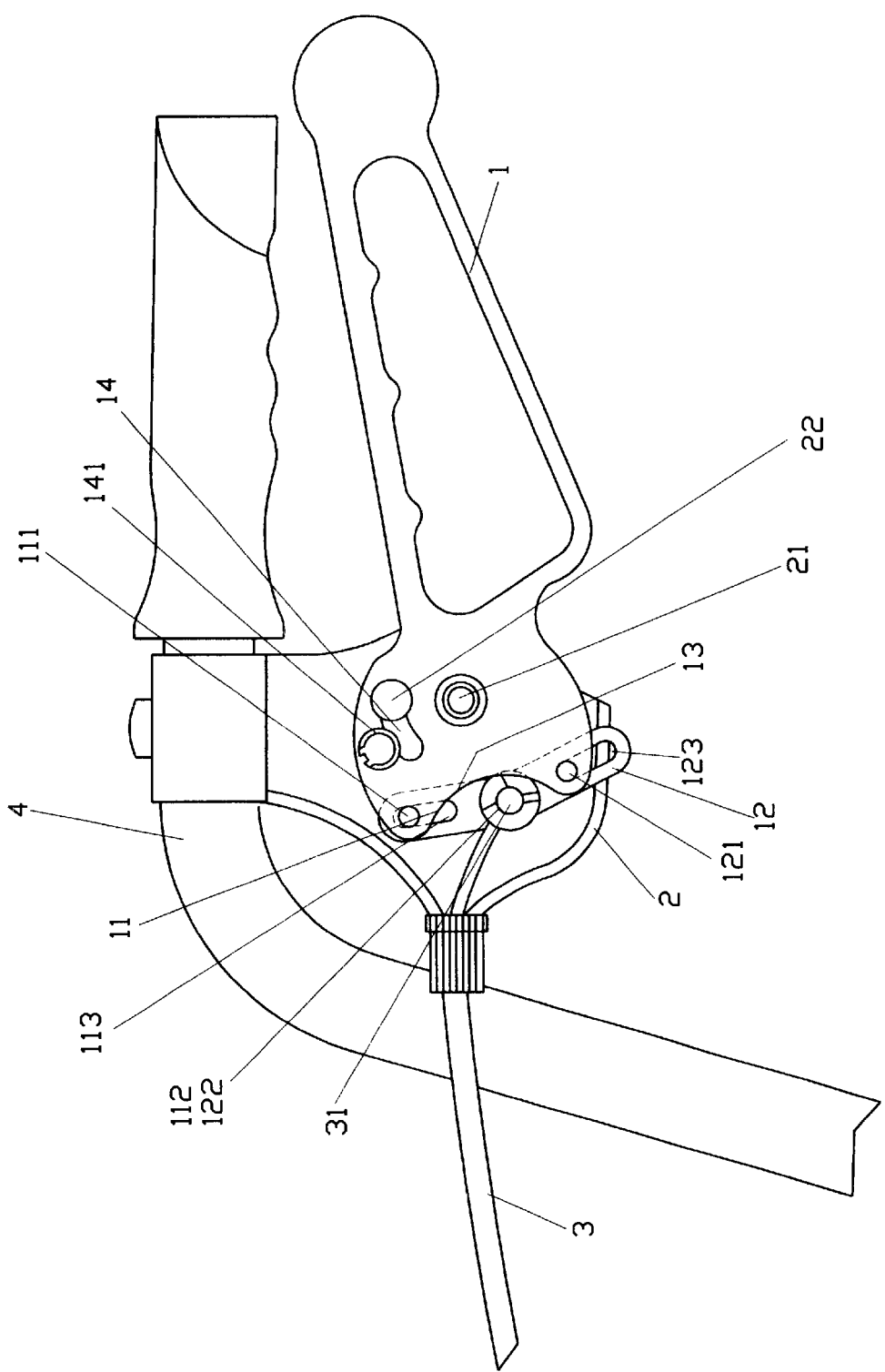
FIG. 4 is a perspective view of a second embodiment of the present invention.

If the grip 1 is pulled towards the handle 4, the connecting pins 111 and 121 will also slide within the rail 113 and 123 of the linking rods 11 and 12 which pull the brake wire 3 to stop the moving, as shown in FIG. 4. Upon the stop pin 22 slides to the other end in the arc trough 14, the stop pin 22 is pressed to force the large section 221 to slide into the locating hole 142, whereas the spring (not shown) of the brake 3 provides a constant urging force to hold the stop pin 22 at place. To slightly pull of the grip 1, the spring 223 of the stop pin 22 shall rebound the stop pin 22 to resume the small section 222 returning to the arc trough 14.

I claim:

1. A brake system for an auxiliary moving device comprising a grip, a cover, a brake wire and a handle, wherein said cover being secured to said handle and said grip being pivoted to said cover, said grip being secured to one end of a brake wire with a stud to pull said brake wire, whereas the other end of said brake wire having a spring to urge said grip to resume to original position, and the improvements comprising:

said grip comprising a pair of linking rods with a trough on each rod and a pair of connecting pins, each said linking rod further comprising a rail, the front end of said grip comprising an arc edge and having a pair of holes at respective ends for said connecting pins of said linking rods to insert there through to secure said linking rods to said grip, said linking rods further connected to a stud of said brake wire wherein said pair of linking rods are movable relative to said grip;

thus, by pulling said grip towards to or away from said handle, said linking rods pulling said brake wire.

2. The brake system for an auxiliary moving device, as recited in claim 1, wherein said grip comprises an arc trough with an elastic stopper at one end, and a locating hole at the other end, said locating hole having a larger diameter than that of said arc trough, said cover comprising a stop pin being inserted through said arc trough, said stop pin comprising a large section and a small section, and a spring, said small section being in said arc trough, constantly.

3. The brake system for an auxiliary moving device, as recited in claim 2, wherein said small section of said stop pin is clamped in said arc trough and held by an elastic stopper.

4. The brake system for an auxiliary moving device, as recited in claim 2, wherein by pressing said large section of said stop pin, said large section slides into said arc trough.

* * * * *